United States Patent [19]
Millier et al.

[11] Patent Number: 5,671,342
[45] Date of Patent: Sep. 23, 1997

[54] METHOD AND APPARATUS FOR DISPLAYING INFORMATION RELATING TO A STORY AND A STORY INDICATOR IN A COMPUTER SYSTEM

[75] Inventors: Marshall A. Millier, Hillsboro; Edward R. Harrison, Beaverton; Bradford Needham, Hillsboro, all of Oreg.

[73] Assignee: Intel Corporation, Santa Clara, Calif.

[21] Appl. No.: 347,809

[22] Filed: Nov. 30, 1994

[51] Int. Cl.⁶ .................................................. G09B 29/00
[52] U.S. Cl. ........................................................ 395/118
[58] Field of Search .................................. 395/161, 600, 395/118, 601, 335; 434/136

[56] References Cited

U.S. PATENT DOCUMENTS

| | | | |
|---|---|---|---|
| 4,951,212 | 8/1990 | Kurihara et al. | 364/449 |
| 5,031,223 | 7/1991 | Rosenbaum et al. | 382/101 |
| 5,032,989 | 7/1991 | Tornetta | 364/401 |
| 5,222,234 | 6/1993 | Wang et al. | 395/600 |
| 5,265,024 | 11/1993 | Crabill et al. | 364/443 |
| 5,274,758 | 12/1993 | Beitel et al. | 395/154 |
| 5,283,638 | 2/1994 | Engberg et al. | 348/14 |
| 5,321,803 | 6/1994 | Ditter, Jr. | 395/161 |
| 5,339,392 | 8/1994 | Risberg et al. | 395/161 |
| 5,379,215 | 1/1995 | Krukoeffer et al. | 364/420 |
| 5,390,330 | 2/1995 | Talati | 395/700 |
| 5,404,440 | 4/1995 | Asahi | 395/155 |
| 5,465,401 | 11/1995 | Thompson | 455/89 |

OTHER PUBLICATIONS

Zue, Victor W., "Toward Sytems that Understanding Spoken Language," *IEEE Expert Magazine*, pp. 51–59, (Feb. 1994).

*Primary Examiner*—Heather R. Herndon
*Assistant Examiner*—Rudolph Buchel
*Attorney, Agent, or Firm*—Blakely, Sokoloff, Taylor & Zafman

[57] ABSTRACT

A method and apparatus for displaying information relating to a news story in a computer system. A computer system receives a news story, determines a corresponding geographical location to the location of the news story, and displays a story indicator on a map using the location corresponding to the news story, such that the information displayed relates to the news story and the story indicator. The story indicator displayed on the map also fades, where the fade rate is a function of the aging of the news story.

17 Claims, 7 Drawing Sheets

METHOD AND APPARATUS FOR DISPLAYING INFORMATION RELATING TO A STORY AND A STORY INDICATOR IN A COMPUTER SYSTEM

BACKGROUND OF THE INVENTION

1. Field of Invention

The present invention relates to the field of the presentation of information. In particular, the present invention describes a method and apparatus for displaying and accessing stories.

2. Description of Related Art

A news wire service provides a subscriber with a continuous feed of news stories. Many different news wire services exist, for example, Associated Press, CNN Headline News, Dow Vision, USENET News. Subscribers can receive thousands of stories per day. The stories can, for example, relate to foreign, national, local, human interest, or business news.

A subscriber must sort and filter the stories to determine their relevance. Receiving thousands of stories a day can make this task difficult. Some subscribers need only the most recent stories, other subscribers need stories on a particular topic or group of topics, other subscribers only need stories relating to a particular geographic area.

One previously available system, MapLinks, uses a map and a zip code database to provide access to information about businesses in the area. A user can drag out a circle on the map to select information about the area. One problem with this system is that the information is static. That is, the information in the database is not continuously updated. Also, the existence, or absence, of information for a particular map location is not indicated on the map. Rather, the user must first define the area on the map, and then cause the system to search the database before any indication about the existence of information is available.

Other systems are based on the Geographic Information System (GIS). GIS merges data from a database with a map. GIS produces a map, often color coded, showing the data from the database. For example, the land ownership in the state of Oregon can be displayed with GIS (federal land being one color, state land being another color, etc.). However, often a query system is not supported by the GIS, nor is the produced map dynamically updated with new information.

Neither of these systems address some needs of news wire subscribers. For some subscribers, the timeliness of a story is crucial. Being able to quickly identify a new important news story can have a significant impact on a subscriber. For other subscribers, the general geographic location is important. For example, news from Bosnia and Monrovia may be important. What is needed is a method and apparatus for displaying a relationship between two or more variables in relation to stories and accessing those stories.

SUMMARY OF THE INVENTION

A method and apparatus for displaying a relationship between two or more variables in relation to stories and accessing those stories.

A method and apparatus of displaying information relating to a story in a computer system. The method comprises the following steps. The computer system receives the story. The computer system determines a location corresponding to the story. The computer system displays a story indicator on a map using the location. The information relates to said story including said story indicator.

Although a great deal of detail has been included in the description and figures, the invention is defined by the scope of the claims. Only limitations found in those claims apply to the invention.

BRIEF DESCRIPTION OF THE DRAWINGS

The present invention is illustrated by way of example, and not limitation, in the figures. Like references indicate similar elements.

DESCRIPTION OF THE PREFERRED EMBODIMENT

OVERVIEW OF ONE EMBODIMENT OF THE PRESENT INVENTION

A method and apparatus for displaying a relationship between two or more variables in relation to stories and accessing those stories is described. The relationship can be displayed in a carlographic form. In the following description, specific details are set forth such as story selection with rubberbanding, etc., in order to provide a thorough understanding of the present invention. In other instances, known circuits, structures and techniques have not been shown in detail in order not to obscure the present invention.

In one embodiment of the present invention, story indicators are displayed on a map. Each story indicator represents a story. Each story indicator is displayed at a location corresponding to the origin of the story. The map is dynamically updated. New stories are displayed while older stories fade away. In one embodiment, an area on the map where a new story indicator is displayed scintillates. A user can select a number of stories by identifying an area on the map. Story indicators within the identified area are used to access the stories corresponding to those story indicators. Another embodiment of the present invention supports a non-real-time playback mode. The display of story indicators for a past period of time can be re-displayed for the user. This allows the user to view the development of stories at a faster or slower rate than real-time viewing provides.

A COMPUTER SYSTEM

Figure 1:
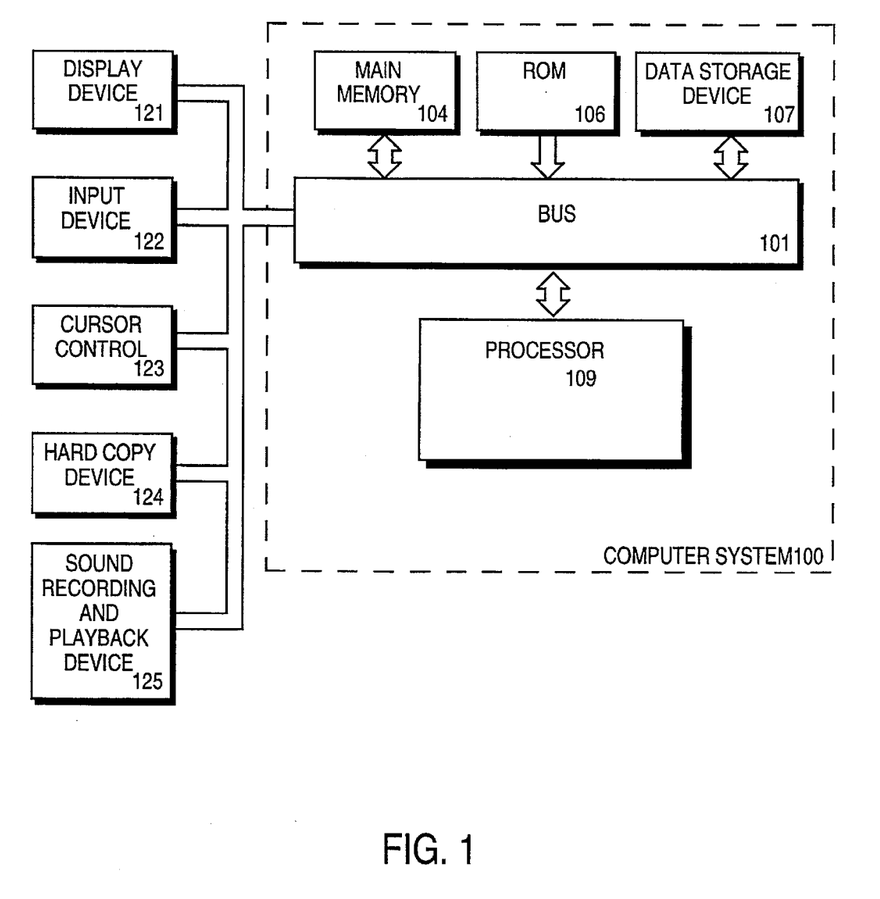
FIG. 1 illustrates a computer system on which one embodiment of the present invention can be implemented.

Referring to FIG. 1, a computer system upon which an embodiment of the present invention can be implemented is shown as computer system 100. Computer system 100 comprises a bus 101, or other communications hardware and software, for communicating information, and a processor 109 coupled with bus 101 for processing information. Computer system 100 further comprises a random access memory (RAM) or other dynamic storage device (referred to as main memory 104), coupled to bus 101 for storing information and instructions to be executed by processor 109. Main memory 104 also may be used for storing temporary variables or other intermediate information during execution of instructions by processor 109. Computer system 100 also comprises a read only memory (ROM) 106, and/or other static storage device, coupled to bus 101 for storing static information and instructions for processor 109. Data storage device 107 is coupled to bus 101 for storing information and instructions.

Furthermore, a data storage device 107, such as a magnetic disk or optical disk, and its corresponding disk drive, can be coupled to computer system 100. Computer system 100 can also be coupled via bus 101 to a display device 121 for displaying information to a computer user. Display device 121 can include a frame buffer, specialized graphics rendering devices, a cathode ray tube (CRT), and/or a flat panel display. An alphanumeric input device 122, including alphanumeric and other keys, is typically coupled to bus 101 for communicating information and command selections to processor 109. Another type of user input device is cursor control 123, such as a mouse, a trackball, a pen, a touch screen, or cursor direction keys for communicating direction information and command selections to processor 109, and for controlling cursor movement on display device 121. This input device typically has two degrees of freedom in two axes, a first axis (e.g., x) and a second axis (e.g., y), which allows the device to specify positions in a plane. However, this invention should not be limited to input devices with only two degrees of freedom.

Another device which may be coupled to bus 101 is a hard copy device 124 which may be used for printing instructions, data, or other information on a medium such as paper, film, or similar types of media. Additionally, computer system 100 can be coupled to a device for sound recording, and/or playback 125, such as an audio digitizer coupled to a microphone for recording information. Further, the device may include a speaker which is coupled to a digital to analog (D/A) converter for playing back the digitized sounds.

Also, computer system 100 can be a terminal in a computer network (e.g., a LAN). Computer system 100 would then be a computer subsystem of a computer system including a number of networked devices.

To access stories, computer system 100 can connect to a wire service using the computer network or using a modem. The computer system 100 can receive stories directly from the wire service or from a database connected to network. The computer system 100 can also include a database of stories.

DISPLAYING INFORMATION ON A MAP

Figure 2:
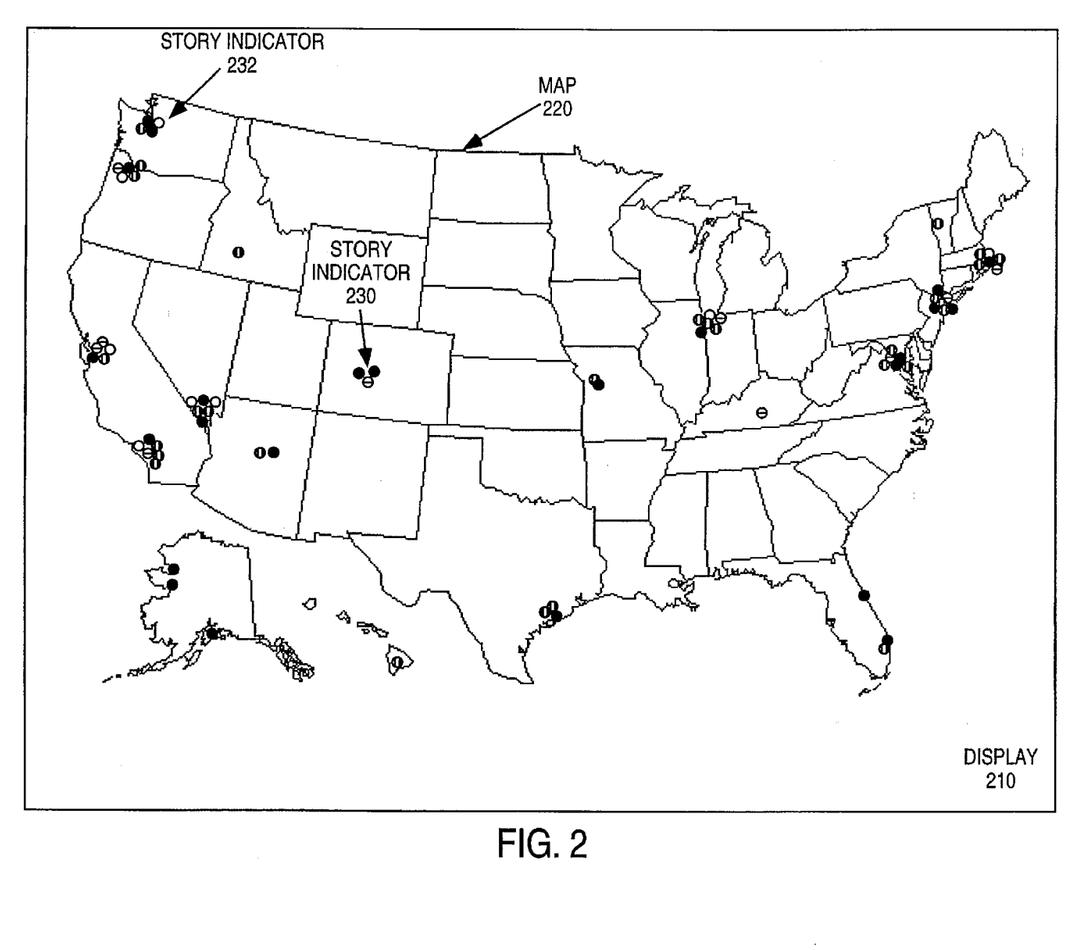
FIG. 2 illustrates a map upon which a number of story indicators are displayed.

FIG. 2 illustrates a map upon which a number of story indicators are displayed. This map can be displayed on display device 121 in the computer system of FIG. 1. Display 210 corresponds to what a user would see displayed upon display device 121.

Map 220 represents a typical map upon which story indicators are displayed. In this example, the map is a map of the United States. However, the map can be represent a larger geographic area such as the entire world, or a smaller geographic area such as the state of Oregon. Other types of carlographic formats can also be used. For example, topic maps representing multi-variant data, such as, company size, the annual net revenue, the annual gross revenue, types of crimes, population density, etc., can be used. A map may have more than two dimensions.

Story indicators represent stories. Each story indicator corresponds to a different story. In this embodiment, a story indicator is a colored circle. Black story indicators correspond to recent stories. Older stories are represented by lighter shades. The oldest stories are represented by a white circle. A story may correspond to some text, a video, sound, or any information that can be associated with a location, or other map variable. Each story can be received from a wire service, a database, or some other system that provides information. In one embodiment, a story is a description of an event. In one embodiment, a story includes a byline and a body of information. In one embodiment, the byline includes the name of the location of the origin of the story. In another embodiment, a story includes a rifle. For the simplicity of the following discussion, references will only be made to a wire service, however, any other system that provides information can be used instead. In one embodiment, systems that provide information have a time varying attribute. Story indicator 230 corresponds to a story from Denver, Colo. Two other story indicators are displayed at that general location. Another story indicator 232 is displayed near Seattle. This story can, for example, correspond to a story about Microsoft Corporation.

Figure 3:
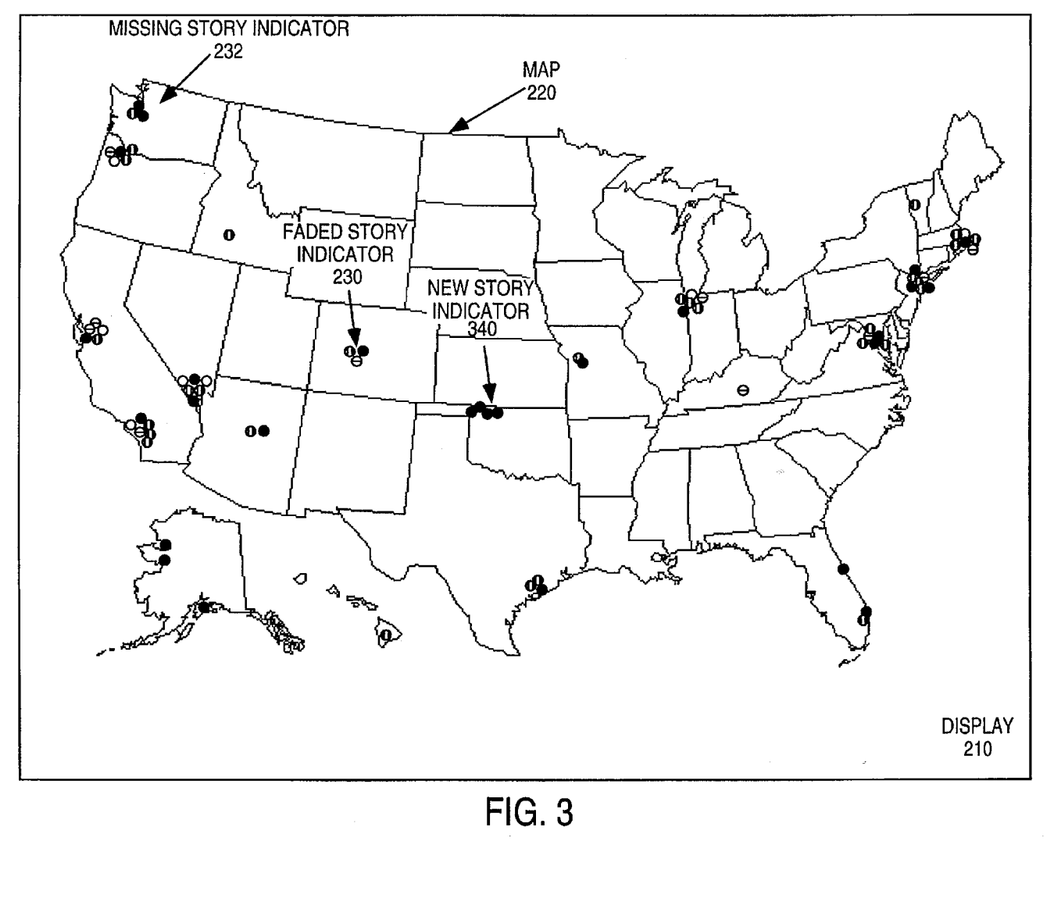
FIG. 3 illustrates the map of FIG. 2 but at a later time.

FIG. 3 illustrates the map of FIG. 2 but at a later time. Story indicator 230 has begun to fade. This indicates that the story corresponding to story indicator 230 has begun to age. By correlating the color of a story indicator with a story's age, a user can easily select which stories are the newest and which are older. This allows a user to identify the most recent stories. Story indicator 232 is no longer displayed. Story indicator 232 has completely faded away. However, new story indicator 340 has been displayed. A number of other story indicators have also been displayed near story indicator 340. In one embodiment, story indicator 340 corresponds to a story about a tornado in Kansas. That is, a story from Kansas has been received from the wire service and corresponding story indicator 340 has been displayed on map 220. In one embodiment, a story indicator will scintillate when first displayed. This helps draw a user's attention to a new story.

In one embodiment of the present invention, a user can have the system replay the displaying of story indicators for a period of time. The system can replay, or playback, at non-real-time rates. Playing back works like normal displaying, only the scale for one variable is changed. For example, the time scale is modified so that the playback occurs at non-real-time rates. In one embodiment, a playback rate and a start time are determined (predefined or user defined). The playback rate determines the relationship between the rate of the replaying and real-time. The fading of the story indicators is correspondingly affected by the playback rate. The start time defines beginning time for the playback. The computer system 100 determines a playback time from the start time plus, the playback rate multiplied by the elapsed real-time since the beginning of the playback. The computer system then accesses old stories according to the playback time and displays the corresponding story indicators. The old stories can be stored in the computer system 100, can be stored in a database on a network coupling to computer system 100, or can be accessed from a wire or similar service. Displaying at a faster than real-time playback rate allows a user to quickly analyze how stories developed, for example, over a number of hours, days, or years. Combining the playback mode with filtering allows a user to see how stories on particular topics developed.

Figure 4:
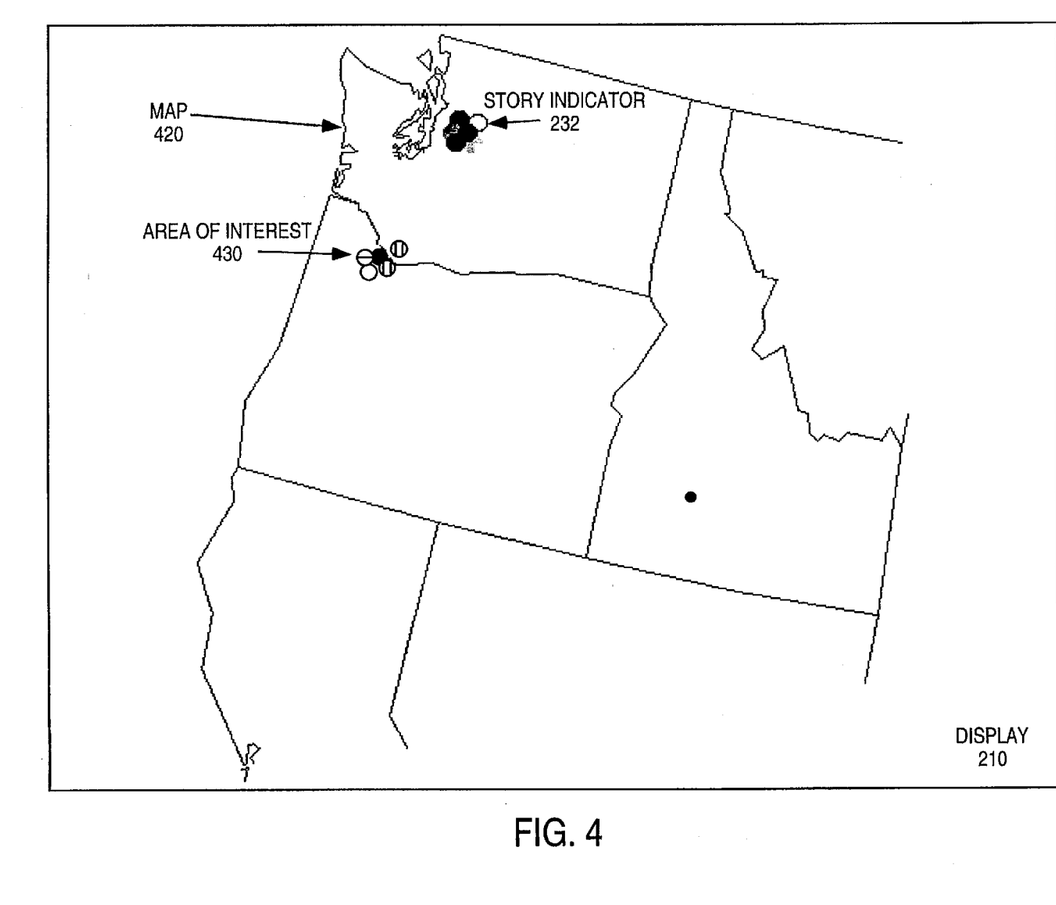
FIG. 4 illustrates a zoomed in view of the map of FIG. 2.

FIG. 4 illustrates a zoomed in view of the map of FIG. 2. A user can zoom in on a particular area of map 220 to better discern individual story indicators. Map 420 is a zoomed in map of the Northwestern United States. Assume that a user is particularly interested in stories from the Portland, Oreg., area. This corresponds to area of interest 430.

Figure 5:
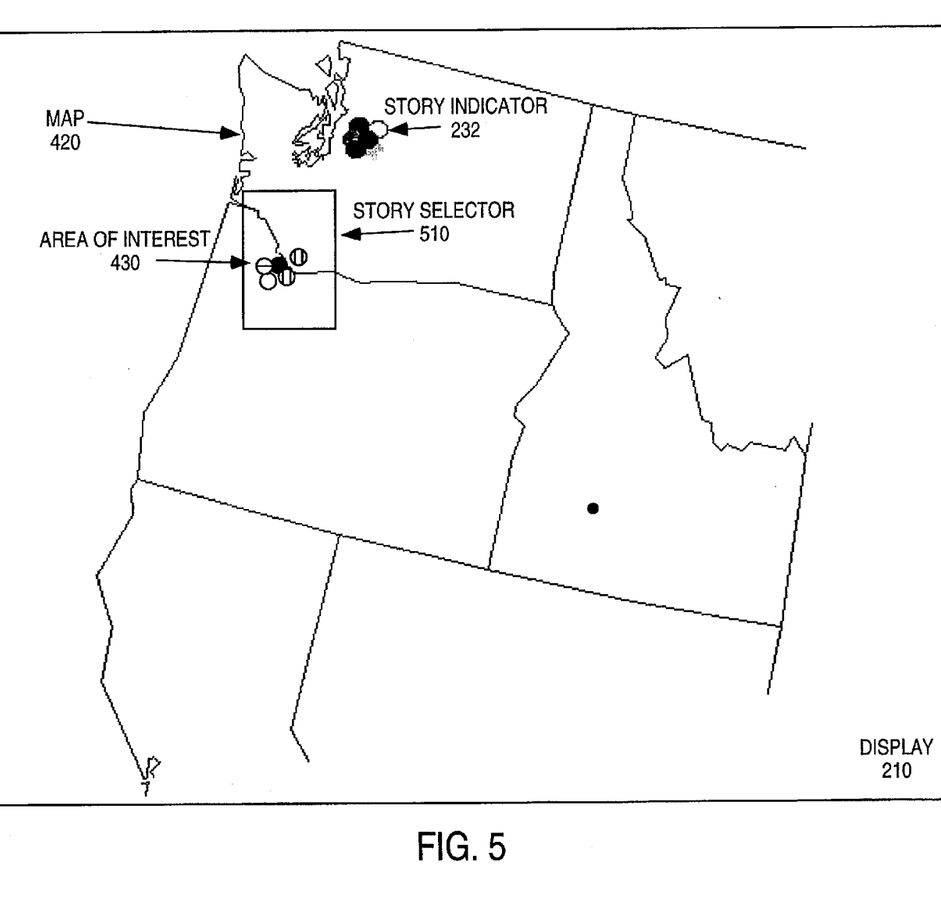
FIG. 5 illustrates a selection of stories from the zoomed in view of the map of FIG. 2.

FIG. 5 illustrates the map of FIG. 4 where the user has used a story selector 510 to select stories of interest in the area of interest 430. In this embodiment, the user can use a rectangular rubberbanding selector to select story indicators in the area of interest 430. Once the story indicators have been selected, the corresponding stories can be reviewed by the user. Of course other types of story selectors could be used. For example, a circular rubberbanding selector can be used, or an icon of a hand, or a pointer can be used to select individual stories. What is important is that the user is provided with some way of selecting stories that are located on a portion of the map. This allows a user to identify stories of interest for a specific location very quickly.

In one embodiment, a story indicator corresponds to a number of stories in a particular region. For example, map 220 shows a number of stories centered around Los Angeles. Rather than displaying different story indicators for each story from the area, only a single indicator is displayed. The story indicator can be a number indicating the number of stories from the area, or the story indicator can grow in size with the number of stories. When a user zooms into the area, then individual story indicators can be displayed for each story from the area.

In one embodiment of the present invention, stories received from the wire service are filtered before they are displayed. The filtering can have a number of effects. A user may have an interest in stories relating to a particular technology field. Stories received from the wire service not pertaining to that particular technology would first be filtered out. No story indicators would be displayed for these stories. In another embodiment, stories relating to a topic that the user has already seen are filtered out. In another embodiment, the filtering identifies some characteristic about the story and this characteristic effects the corresponding story indicator. For example, a story relating to violence can be associated with a story indicator that is in the shape of a gun or is displayed in the color red. The characteristic can be used to fade stories. For example, the user can define that a story about O. J. Simpson can be faded much more quickly than any other story.

As mentioned previously, once the stories are selected, they can then be displayed for the user. Of course if a story is a video clip, or an audio clip, these stories can be played for the user. In one embodiment of the present invention, a system for incrementally browsing structured objects can be employed to display the stories. Intel Corporation of Santa Clara, Calif., demonstrated such a system, called Special Edition™, at the National Cable Television Association Show, in May of 1994. Other systems for displaying the stories can be used. For example, a USENET news reader such as TRN can be used. The Information Visualizer from Xerox PARC, of Palo Alto, CA, and described in "Communications of the ACM," April, 1993, can also be used to display the stories.

AN EMBODIMENT OF A METHOD OF DISPLAYING STORY INDICATORS ON A MAP

Figure 6:
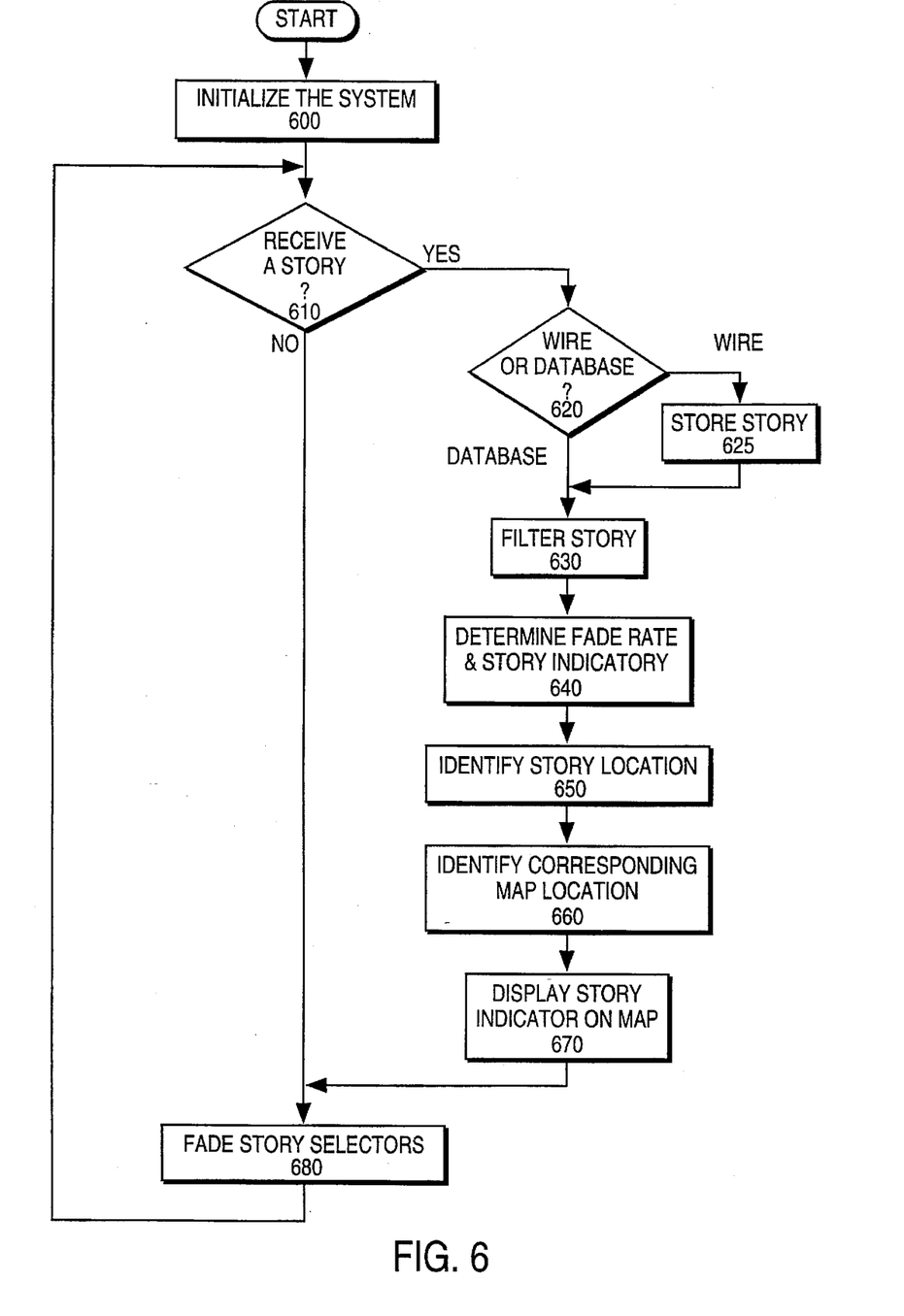
FIG. 6 illustrates one embodiment of a method of displaying story indicators on a map.

FIG. 6 illustrates an embodiment of a method of displaying story indicators on a map. This embodiment can be implemented using the computer system of FIG. 1. This embodiment can generate the display 210 of FIGS. 2–5.

At step 600, the system is initialized. Typically, this includes accessing the wire service, or database, from which stories will be received, and accessing the map database. This embodiment is now ready to receive stories.

At step 610, a test is made to determine whether a new story has been received. A story can be received directly from the news wire or a database of stories. Where a playback is being displayed, this step includes testing whether the playback time corresponds to any stories. If a story has a time associated with it that is less than the present playback time, but later than the last playback time, then the story is considered received. The playback can also be run in reverse. If no stories are received, then step 680 is executed. If a story is received, then step 620 through step 670 are executed.

At step 620, a decision is made depending upon where the new story was received from (e.g. from the wire service or a story database). If the story is received from the wire service, then the story is stored at step 625. Typically, the story will be stored in a database. Stories are stored in the database for two reasons. First, when a user selects a map indicator, the system can access the database and display the story for the user. Secondly, a user can replay the history of the map. For example, a user can replay the activities of the preceding two days at a much increased rate to determine how stories developed.

At step 630, the story is filtered. As mentioned previously, the user can define certain filters for stories. The user can also use predefined filters. The filtering determines whether a story indicator for the story should be displayed. If the filter determines that no story indicator should be displayed, then no further processing of the story is done. The filtering helps the user select stories of interest to that user.

Assuming that a story indicator is to be displayed for the story, then at step 640, a fade rate for the story is determined. The fade rate is the rate at which a story indicator will fade from display 210. The fade rate can be fixed or variable. The fade rate can be fixed for all stories, determined according to the type of story, or determined from the information that comes with the story. In one embodiment, the fade rate is determined by the wire service. For example, Dow Vision can update a story over a period of hours or days and indicates in the transmission of a story when the story is to be considered out of date. CNN Headline News may fade over hours. The fade rate can also be determined by the number of stories arriving or the number of stories already displayed. The fade rate can be set higher or lower for topics that the user has already accessed.

At step 640, a story indicator is also determined for the story if necessary. If the type of story indicator is to correspond to the type of story, such as an icon showing grain for a story about farming, then that story indicator is determined. Story indicators can differentiate stories using color, shape, a word or phrase, a picture (e.g. icon of a gun for story on crime), an animation, or a thumbnail picture of video clip. The story indicators can indicate the source of the story or whether the story is text, audio, or video. The type of story indicators can be predefined or user defined.

At step 650, the location of the story is determined. For one embodiment of the present invention, stories include a location in the byline. Stories from Associated Press news service are such stories. In one embodiment, the name of a city, state, town, county, or the like is determined from the story's content. That is the location names are extracted from the text, audio, and/or video, of the story. In one embodiment, a full keyword index on the story is matched against a database of location names to determine all the locations referred to in the story. This allows a user to identify stories written about other places. For example, a user can find a Washington story written about California. In any case, what is important is that a location of the story is determined.

At step 660, the corresponding location on the map is determined from the name of the location. In one embodiment, the computer system of FIG. 1 includes a database of location names cross referenced with map locations. In one embodiment, the location names are found in a database that includes the latitude and longitude of the location. The latitude and longitude are then used to determine a location on the map. In one embodiment, if no corresponding map location can be found, then a story indicator is not displayed. For example, if a map of the United States is displayed and a story is received that has a location of Ottawa, Canada, then the story indicator will not be displayed.

At step 670, the story indicator is displayed at the map location. In one embodiment of the present invention, multiple story indicators that are displayed for one location are displayed near that location so that individual story indicators can be seen. For example, on map 220, many story indicators are displayed for Los Angeles. Rather than displaying story indicators completely on top of each other, and possibly obscuring story indicators underneath, story indicators are displayed near the location. In one embodiment, newer stories, for a location, are displayed closer to the center of the location while older stories, for that location, are displayed proportionately further away.

At step 680, a test is made to determine whether any story indicators should be faded. If so, those story indicators are either displayed as new faded story selectors, or are no longer displayed because they have completely faded away. In one embodiment, to save storage space, stories having faded away story indicators are no longer stored.

Note that some of these steps can be reordered while still displaying the correct story indicators. For example, step 620 and 625 can be moved after step 630 to reduce the size of the database used to store stories from the wire service.

AN EMBODIMENT OF A METHOD OF ACCESSING STORIES DISPLAYED ON A MAP

Figure 7:
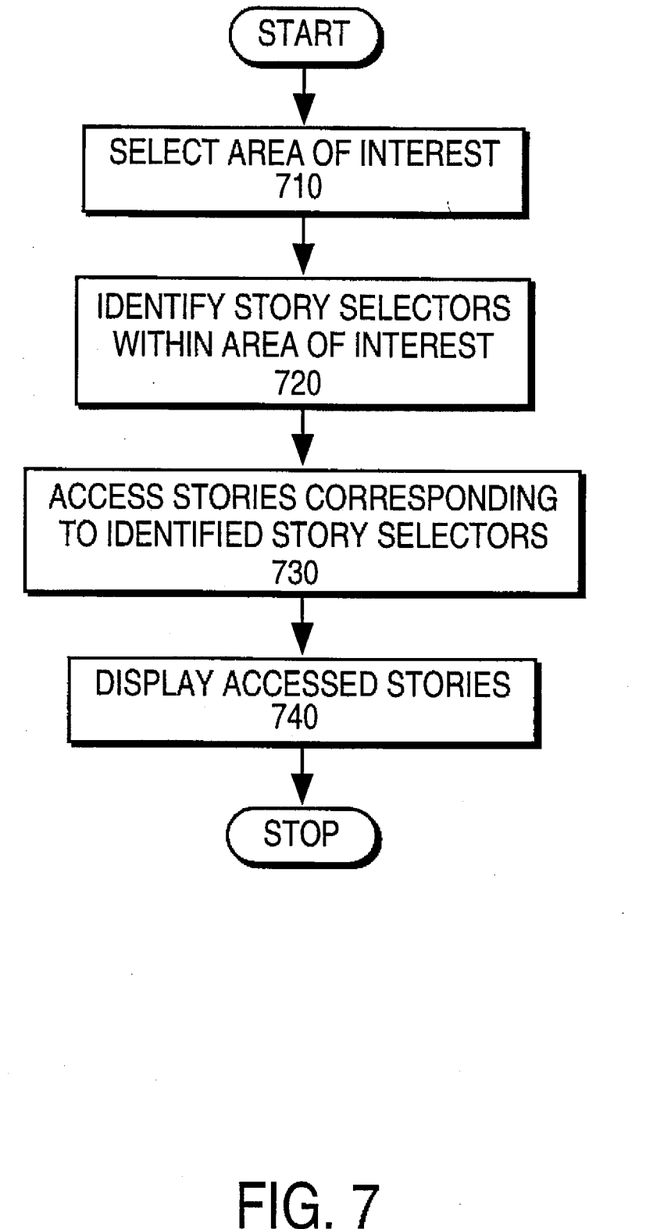
FIG. 7 illustrates one embodiment of a method of accessing a number of stories being displayed on a map.

FIG. 7 illustrates one embodiment of a method of accessing a number of stories being displayed on a map. This embodiment can be implemented using the computer system of FIG. 1.

At step 710, an area of interest is selected. This can be done by the user using a rubberbanding technique. The system then determines the area of interest.

At step 720, the system identifies the story selectors within the area of interest.

At step 730, the stories corresponding to the identified story selectors are accessed from the storage location (see step 625). In another embodiment, stored stories are examined to determine whether they have a location corresponding to the area of interest. Any story having a corresponding location is then identified.

At step 740, the accessed stories are displayed for the user. Any number of display techniques can be used. For example, only a textual abstract for each story can be displayed.

Thus, a user can sort and filter a large number of stories. The stories can be in a number of formats such as text, video, or audio. The map displaying the stories indicators is constantly being updated with new stories, while older stories are allowed to fade away. Thus the user can efficiently select the newest stories for a particular location on the map. A method and apparatus for displaying a relationship between two or more variables in relation to stories and accessing those stories has been described. The relationship can be displayed using a cartographic form.

What is claimed is:

1. A method of displaying information relating to a news story by a computer system, said method comprising the steps of:

receiving said news story;

determining a location corresponding to the geographic location where said news story originated;

displaying a story indicator on a map using said location, such that said story indicator is placed at said location corresponding to the geographic location where said news story originated; and fading said story indicator on said map using a fade rate determined by said computer system.

2. The method of claim 1 further comprising the steps of:

after said computer system receiving said news story, said computer system filtering said news story; and said computer system determining whether or not to display said story indicator depending on said filtering said news story.

3. The method of claim 1 further comprising the steps of:

said computer system determining a type of story indicator from information within said news story.

4. The method of claim 1 wherein said computer system receives said news story from a wire service and said computer system stores said news story.

5. The method of claim 1 further comprising the steps of:

said computer system detecting a selection of a geographical area of interest, said geographical area of interest including said location;

said computer system identifying said news story as corresponding to said geographical area of interest;

said computer system displaying said news story, said information including said news story.

6. The method of claim 5 wherein said step of said computer system identifying said news story as corresponding to said geographical area of interest includes the steps of:

said computer system determining that said location is included in said geographical area of interest;

said computer system determining that said story indicator corresponds to said location;

said computer system using said story indicator to identify and access said news story.

7. The method of claim 1 wherein said news story includes a byline and said byline includes a name of said location and wherein said computer system uses said name of said location to determine said location.

8. An apparatus for displaying a plurality of story indicators on a map, said apparatus including:

a network connection that receives a plurality of news stories, each news story of said plurality of news stories including a location name and a body of information;

a memory that contains said plurality of news stories;

a display that displays said map with said plurality of story indicators;

an input device that allows a portion of said map to be selected for viewing in said display; and, a processor being coupled to said network connection, said input device and said memory, said processor generates said plurality of story indicators using said plurality of news stories, each story indicator of said plurality of story indicators being generated from said location name of said each news story of said plurality of news stories, said processor further signaling said display to display said plurality of story indicators and fading said plurality of story indicators, to correspond to aging of said news stories.

9. The apparatus of claim 9 wherein each story indicator of said plurality of story indicators is displayed at a location on said map corresponding to location name.

10. The apparatus of claim 8 wherein said location name is included in a byline of said each news story.

11. The apparatus of claim 8 wherein said location name is included in said body of information, and wherein said processor is for identifying said location name in said body of information.

12. The apparatus of claim 8 wherein said body of information includes at least one of textual information, audio information, and video information.

13. The apparatus of claim 8 wherein each news story of said plurality of news stories includes a plurality of location names, and said processor is for generating a story indicator for each location name of said plurality of location names.

14. A method of accessing a plurality of news stories in a computer system, said method comprising the steps of:

detecting a selection of an area of interest, said area of interest being a portion of a map including a set of story indicators, each story indicator of said set of story indicators corresponding to a news story of a set of news stories and fading at a rate corresponding to the age of the news story;

determining a subset of news stories of said set of news stories, each news story in said subset of news stories having a location within said area of interest; and, displaying said subset of news stories.

15. The method of claim 14 wherein said computer system determines said subset of news stories by determining a subset of story indicators being located within said area of interest, accessing a corresponding subset of news stories.

16. The method of claim 17 wherein said computer system detects a selection of said area of interest identifying a completion of a rubberbanding selection by a user.

17. A method of providing at least a visual display of a geographic location of a news story through a computer system, said method comprising the steps of:

receiving said news story from a remote source;

determining the geographic location where said news story originated;

displaying a story indicator on a map using said geographic location, such that said story indicator is placed at said geographic location where said news story originated; and fading said story indicator at a rate corresponding to aging of said news story.

* * * * *

UNITED STATES PATENT AND TRADEMARK OFFICE
CERTIFICATE OF CORRECTION

PATENT NO. : 5,671,342
DATED : September 23, 1997
INVENTOR(S) : Miller et al.

Page 1 of 1

It is certified that error appears in the above-identified patent and that said Letters Patent is hereby corrected as shown below:

Column 2,
Line 33, delete "carlographic" and insert -- cartographic --.

Column 3,
Line 61, delete "carlographic" and insert -- cartographic --.
Line 12, delete "rifle" and insert -- title --.

Column 9,
Line 9, delete "of claim 9" and insert -- of claim 8 --.

Column 10,
Line 12, delete "of claim 17, and insert -- of claim 15 --.

Signed and Sealed this

Twenty-first Day of August, 2001

Attest:

*Nicholas P. Godici*

NICHOLAS P. GODICI
*Attesting Officer*   *Acting Director of the United States Patent and Trademark Office*